United States Patent Office 2,715,414
Patented Aug. 16, 1955

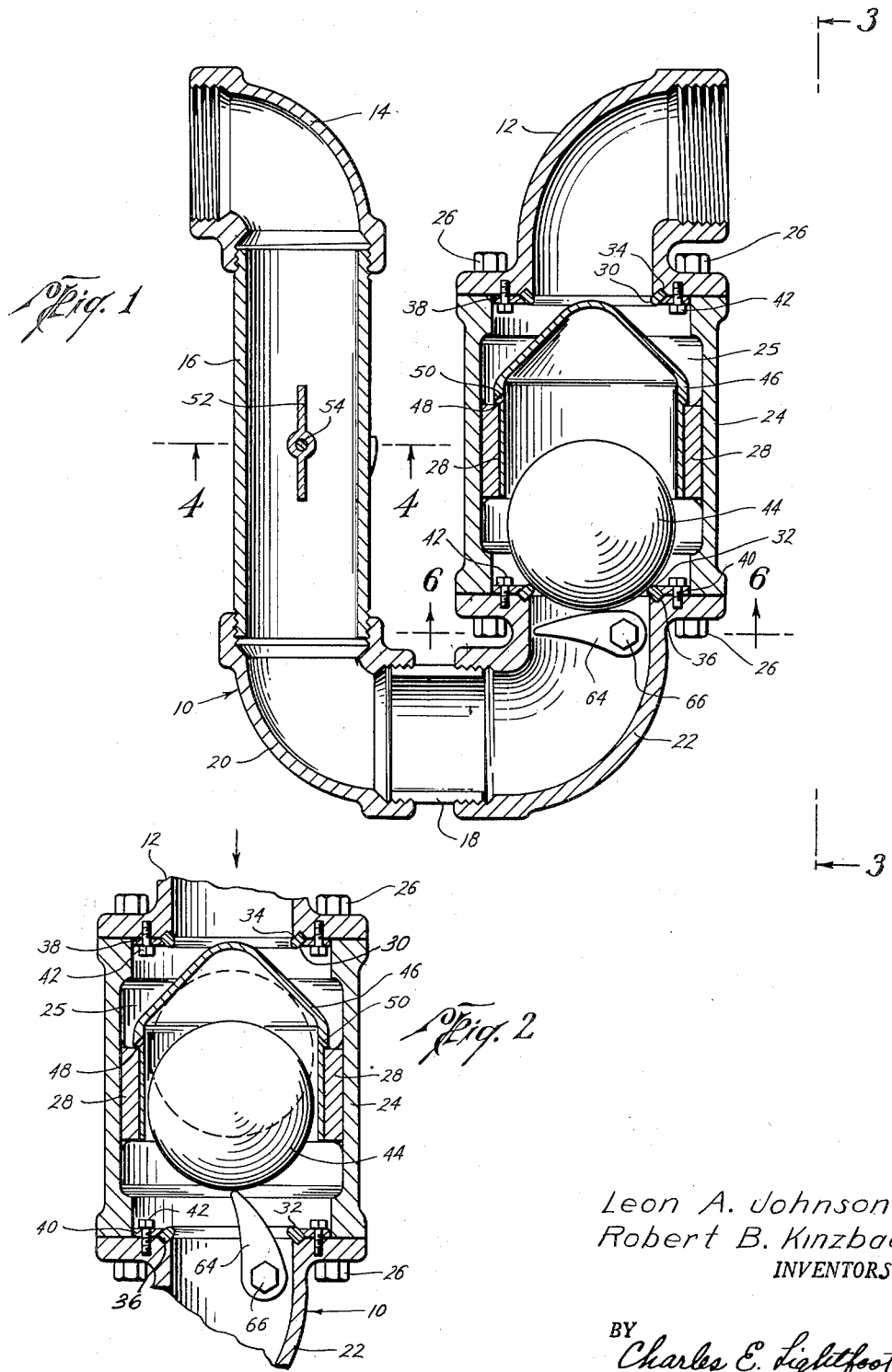

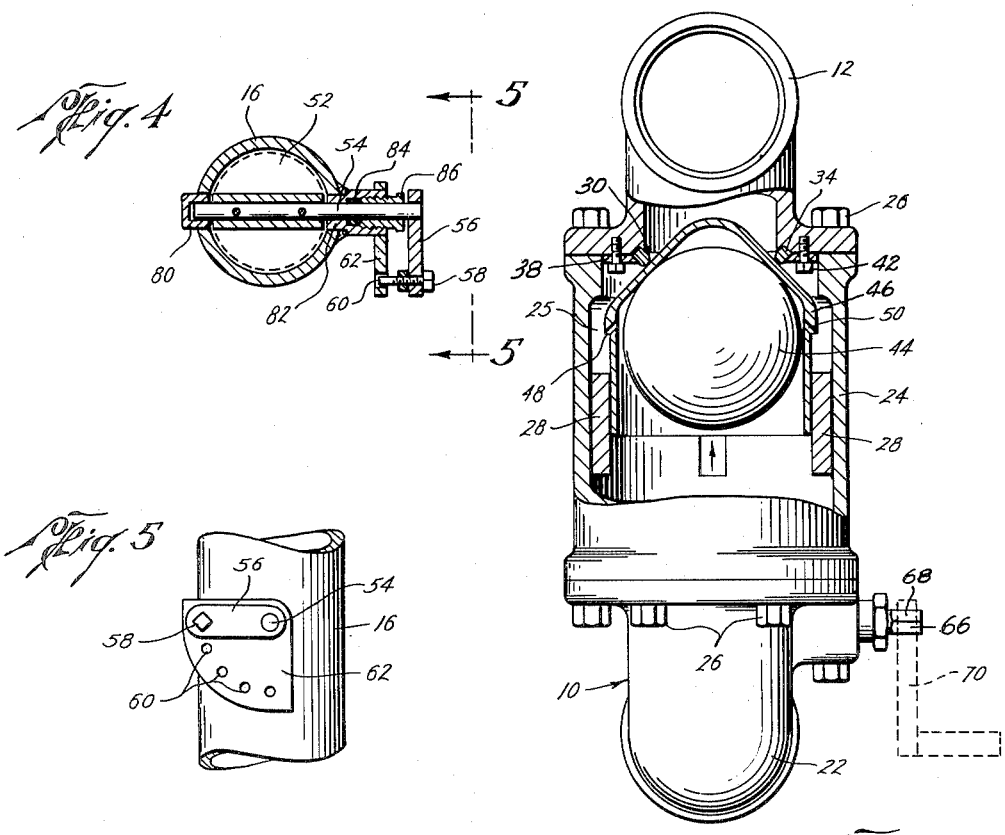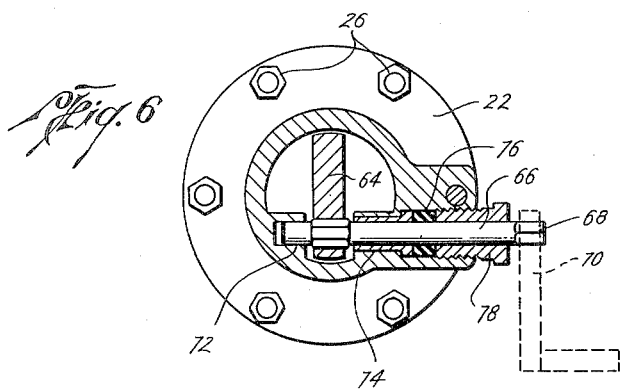

2,715,414

COMBINED AUTOMATIC SHUT-OFF AND CHECK VALVE ASSEMBLY FOR TANKS AND THE LIKE

Robert B. Kinzbach, Houston, and Leon A. Johnson, Snyder, Tex.

Application November 20, 1951, Serial No. 257,302

11 Claims. (Cl. 137—399)

This invention relates to a combined automatic shut-off and check valve assembly for tanks and the like, and more particularly to a valve device adapted to be applied to the discharge outlet of a liquid storage tank or the like, and which operates automatically when the liquid falls to the level of the discharge outlet of the tank to close the outlet, and also functions to prevent the back flow of liquid from the discharge line into the tank.

In the storage and distribution of liquids, such as oil or the like, it is customary to employ a series of storage tanks, whose discharge outlets are connected to a distribution line, and from which liquid may be discharged into the line as desired. Such tanks are frequently situated at different elevations, and the liquid in the tanks is frequently at widely varying levels. The operation of a storage and distribution of this kind, as heretofore practiced, presents a number of problems for which no satisfactory solution has been found, such as the accidental introduction of air into the discharge line when the level of the liquid in a tank reaches the discharge outlet, and the tendency of liquid to flow back through the discharge outlet from a tank at a higher level, or from a tank in which the liquid level is higher than that in another tank in the system.

Another difficulty encountered in the operation of storage tank systems of this character is that the use of float valves of conventional construction is ineffective to prevent a backflow of entrapped air from the distribution line into a tank connected thereto which may result in premature seating of the float.

The use of manually controlled valves in the discharge connection to the distribution line from each tank, as frequently practiced heretofore, necessitates constant attention and checking on the part of an operator, to make certain that back flow from one tank to another does not take place, or that the liquid level in any tank is not permitted to fall below the discharge outlet, which would result in air being drawn into the distribution line.

The present invention has for an important object the provision of a valve assembly for use in the discharge connections of the tanks of a system of the kind referred to, which valve functions automatically to close the discharged connection when the liquid level reaches the discharge outlet, and which also operates automatically to close the discharge connection upon back flow of liquid into the discharge connection.

Another object of the invention is the provision of valve means for use in the outlet connections of tanks in a system of the kind referred to, whereby a continuous flow of liquid may be supplied to the distribution line, as long as the liquid level in any tank in the system is above the discharge outlet thereof.

Another object of the invention is the provision of a valve assembly for use in the discharge connection of a tank, and including a buoyant valve body which is operative when the liquid in the tank falls below a predetermined level to close the discharge connection against the entrance of air from the tank into the connection, and which is also effective to prevent the back flow of liquid into the tank.

Another object of the invention is to provide a valve assembly of the kind referred to having manually operable means for opening the valve to initiate the discharge of liquids from the tank, and which operates automatically after such initial opening.

A further object of the invention is the provision of an automatic shut-off and check valve for tanks including a buoyant valve body which opens under the influence of liquid in the discharge connection of the tank, and also having means for regulating the velocity of the outflow of liquid from the tank, to prevent the closing of the valve by such outflow.

Another object of the invention is to provide an automatic shut-off and check valve structure for tanks having a floating valve body and which includes a U-tube discharge connection, whereby an unbroken liquid column is maintained at all times in the discharge connection of sufficient volume to prevent premature closing of the valve body against outflow of liquid from the tank in the event of back flow of air into the discharge connection.

A still further object of the invention is to provide a valve assembly of the kind referred to which is of simple design and rugged construction, capable of long withstanding the extreme conditions of continuous operation and hard usage to which such apparatus is customarily subjected.

The above and other objects and advantages of the invention will best be understood from the following detailed description, constituting a specification of the same when taken in conjunction with the annexed drawings wherein—

Figure 1 is a vertical, central, cross-sectional view of the invention, showing the valve in closed condition to prevent the entrance of air from the discharge outlet of a tank into the distribution line;

Figure 2 is a fragmentary cross-sectional view, similar to that of Figure 1, showing the manner in which the valve is initially opened to permit the discharge of liquid from a tank;

Figure 3 is an end view of the invention, partly broken away, and partly in cross-section, showing the valve in its closed condition to prevent back flow of liquid through the discharge connection to the tank;

Figure 4 is a cross-sectional view taken along the line 4—4 of Figure 1, looking in the direction indicated by the arrows;

Figure 5 is a fragmentary end elevational view of the portion of the valve mechanism shown in Figure 4 taken along line 5—5; and Figure 6 is a cross-sectional view taken along the line 6—6 of Figure 1, looking in the direction indicated by the arrows.

Referring now to the drawings in greater detail, wherein like numerals of reference are used to designate the same parts throughout the several views, the numeral 10 indicates generally a U-shaped discharge conduit, having one arm thereof provided at its upper end with coupling means, such as the elbow 12 for attachment to the discharge outlet of the tank, and the other arm thereof provided at its upper end with coupling means, such as the elbow 14, for connection to a discharge or distribution line. Suitable means, such as a manually operable valve, not shown, may of course be positioned between the discharge connection 10 and the distribution line, for closing off the discharge connection from the discharge or distribution line when desired.

The discharge conduit may be made up of suitable piping, including the elbows 12 and 14, and pipe sections 16 and 18 together with the elbows 20 and 22. Connected between the elbows 12 and 22, in the arm of the discharge conduit which is connected to the discharge outlet of the tank, there is the valve casing 24, which may be secured to the flanges of the elbows 12 and 22 by suitable fastening means, such as the bolts 26.

The valve casing 24, in the present illustration, is of generally cylindrical configuration, having a flowway 25 therethrough and having circumferentially spaced internal lugs 28, therein mediate the ends of the casing, for a purpose later to be made apparent. The elbow 12 is preferably provided with an annular valve seat element or member 30 at one end of the valve casing, while the elbow 22 is likewise provided with a similar annular valve seat element or member 32 at the opposite end of the valve casing, the seat members being preferably formed of suitable resilient material, such as rubber, or the like, and being disposed in annular grooves 34 and 36, in the respective elbows, and retained therein by ring elements 38 and 40, respectively, secured to the elbows by suitable fastening means, such as bolts 42. The elbow 12 with its valve seat constitutes the inlet of the valve casing while the elbow 22 and its valve seat constitutes the outlet of the valve casing.

Within the valve casing 24 a buoyant valve body 44, which may be in the form of a ball, is disposed for engagement with the seat member 32 to close the discharge conduit upon downward movement of the valve body into engagement with its seat. Above the buoyant valve body 44 there is a second valve member 46, of generally sleeve-like configuration, which is movably disposed between the internal lugs 28 for upward movement in the valve casing into seating engagement with the seat member 30 to close the discharge conduit against back flow of liquid from the distribution line into the tank. The valve member 46 is preferably closed at its upper end, which is of suitable shape to readily seat on the seat member 30. Mediate its ends the valve member 46 is formed with an external annular shoulder 48, which is adapted to engage the upper ends of the internal lugs 28, to limit downward movement of the valve member in the casing, and a number of peripherally spaced openings 50 extend through the valve member 46, for a purpose to be explained hereinafter. The valve member 46 is of substantially smaller external diameter than the internal diameter of the casing so that space is provided between the member and the casing for the passage of liquid therethrough.

The buoyant valve body 44 is of a size to freely move within the valve member 46, so that when the valve casing is filled with liquid, such as oil from the discharge outlet of the tank, the buoyant valve body will move upwardly into the valve member 46, and elevate the same to its closed position, as best seen in Figure 3 of the drawings. When, however, there is an outflow of liquid from the tank through the discharge conduit into the distribution line, downward flow of the liquid through the valve casing displaces the valve member 46 and the buoyant valve body therein, to move the valve to open condition, allowing the liquid to pass around the valve member 46 past the internal lugs 28, and thence through the discharge conduit into the distribution line.

In flowing outwardly past the hollow valve member 46, the liquid causes a reduction in pressure at the openings 50, which results in a corresponding reduction in pressure inside of the member 46, sufficient to effectively hold the buoyant valve body 44 in the member 46 and prevent the same from being drawn by the outflowing liquid downwardly onto the seat member 32. In the event, however, that the outflow of liquid should become sufficiently high in velocity, the suction thus created might become sufficiently high to draw the buoyant valve body 44 to its closed position on the seat member 32, as shown in Figure 1 of the drawings, whereupon the valve would be closed against further outflow of liquid from the tank. To prevent such premature closing of the valve, a regulator valve 52 is provided in the pipe section 16, which in the present illustration takes the form of a butterfly valve, as best seen in Figures 1, 4 and 5 of the drawings, which valve is carried on a rotatable valve stem 54, extending outwardly through the wall of the pipe section, and provided at its outer end with an adjusting lever 56, carrying at its outer end a pin 58, adapted to extend through one of a plurality of openings 60 in a quadrant 62, whereby the position of the butterfly valve may be adjusted to regulate the velocity of the outflow of liquid through the discharge conduit. By suitably adjusting the valve 52, the outflow of liquid from the tank may be prevented from reaching a velocity at which the buoyant valve body 44 will be drawn downwardly into seating engagement with the seat member 32, and the valve will thus be permitted to remain open during the outflow of liquid from the tank.

In order to move the buoyant valve body 44 to open position, in the event that the column of liquid in the discharge conduit has been broken, an actuator cam 64 is provided within the elbow 22, which cam is carried on a rotatably mounted shaft 66, extending outwardly through the wall of the elbow, and provided at its outer end with a squared portion 68, for the attachment thereto of an operating lever or crank 70, by which the cam may be rotated. The cam 64 is movable by rotation into contact with the buoyant valve body 44, to lift the same out of seated engagement on the seat member 32, as best indicated in Figure 2 of the drawings, whereby the initial opening of the valve is accomplished, at the beginning of the outflow of liquid from the tank. The rotatable shaft 66 is, of course, provided with suitable bearings, 72 and 74 within the elbow 22, and suitable packing 76 surrounds the shaft outwardly of the bearings and is retained in place by a gland nut 78, as illustrated in Figure 6 of the drawings.

Likewise, the shaft 54 of the valve 52 is supported in suitable bearings 80 and 82 carried by the pipe section 16, and is surrounded by suitable packing 84, outwardly of the bearings, which packing is retained in place by a gland nut 86, as best seen in Figure 4 of the drawings.

In making use of the invention the discharge conduit is connected to the discharge outlet of a tank by means of the elbow 12, the discharge outlet usually being located somewhat above the bottom of the tank, and the distribution line is connected to the discharge conduit through the elbow 14 thereof, suitable valve means, not shown, being provided for closing off the connection between the discharge conduit and the distribution line. To initiate the opening of the valve, the cam 64 is rotated by means of the crank 70, to lift the buoyant valve body 44 out of the seat member 32, whereupon liquid may be discharged from the tank outlet through the discharge conduit to the distribution line and the buoyant valve body 44 thereafter remains in open position due to its buoyancy in the liquid which now fills the valve casing. The buoyancy of the buoyant valve body 44 and the weight of the valve member 46 are adjusted so that the buoyant valve body will move upwardly into the valve member 46, but due to the outflow of liquid from the tank the valve member 46 is maintained in open position, as indicated in Figure 2. As previously described, the flow of liquid past the valve member 46 causes a reduction in pressure at the openings 50, so that the pressure within the valve member is sufficient to maintain the buoyant body 44 inside the valve member 46 in its open position, as shown in dotted lines in Figure 2.

When the level of liquid within the tank reaches the discharge outlet, the column of liquid in the discharge conduit may be broken, whereupon the buoyant valve body 44 falls to its seated position on the seat member 32, thus closing the discharge conduit to further outflow of liquid therethrough, and preventing the entrance of air from the tank into the distribution line. In this condition of the valve the level of the liquid in the valve casing falls to a point at which the buoyant valve body closes the flowway against the entrance of air from the tank into the discharge connection below the valve seat member 32, but the discharge conduit will remain partially filled with liquid and upon refilling of the tank the continuity of the liquid column in the discharge conduit may again be established. In the event, however, that the buoyant valve body fails to move to open position, such movement can be readily initiated by operation of the cam 64 by the crank 70.

Should the pressure in the distribution line rise sufficiently to cause a backflow of liquid through the discharge conduit into the tank, such backflow will immediately lift the buoyant valve body 44 and the valve member in the valve casing, resulting in bringing the valve member 46 into seating engagement with the seat member 30, thus closing the discharge conduit and preventing backflow of liquid into the tank, as will best be seen in Figure 3 of the drawings.

In the event that there should be a back flow of entrapped air into the discharge connection, the liquid column which is in the U-tube will always be of sufficient volume to cause the buoyant valve body to float away from its seat, or in extreme cases to operate the valve element 46 to close and prevent further back flow through the discharge connection. Thus, the valve is always maintained in condition for outflow of liquid from the tank upon readjustment of the pressure conditions in the discharge connection.

It will thus be seen that the invention as described above provides an automatic shut-off and check valve for tanks, whereby the entrance of air into the discharge conduit when the liquid level in the tank reaches its discharge outlet is effectively prevented, while backflow into the tank from the distribution line is prevented, in the event that the pressure in the distribution line becomes sufficiently high to cause such back flow. The invention possesses the particular advantages that the valve is automatic in operation, and the inconvenience and uncertainty of constant attention and checking of the liquid level in the tank is made unnecessary. The valve apparatus of the invention also has the advantage that it may be easily disassembled and reassembled for purposes of maintenance and repair, and requires no complicated parts or difficult operations which would make its maintenance difficult.

The invention has been illustrated in connection with a certain specific embodiment of the same, but it will be understood that this is intended by way of illustration only, and that numerous modifications can be made in the construction and arrangement of the various parts, without departing from the spirit of the invention, or the scope of the appended claims.

Having thus clearly shown and described the invention, what is claimed as new and desired to secure by Letters Patent is:

1. A combined shut-off and check valve assembly comprising a valve casing having an inlet in communication with a liquid supply source and an outlet in communication with a discharge line, and valve means in said casing operable by gravity to close the outlet when the liquid in the casing falls below a predetermined level, said valve means being operable under the influence of the inflow of liquid from said discharge line through said outlet to close said inlet said valve means including means operable under the influence of the outflow of liquid from said outlet to hold the valve means out of closing relation with said outlet.

2. A combined shut-off and check valve assembly comprising a valve casing having an inlet in communication with a liquid supply source and an outlet in communication with a discharge line, a valve member in the casing movable into and out of closing relation to the inlet and buoyant means in the casing movable into and out of closing relation to said outlet, said buoyant means being operable under the influence of the inflow of liquid from said discharge line through said outlet to move said valve member to close said inlet and said valve member and said buoyant means being cooperable under the influence of the outflow of liquid from said outlet to hold said buoyant means out of closing relation with said outlet.

3. A combined shut-off and check valve assembly comprising a valve casing having an inlet in communication with a liquid supply source and an outlet in communication with a discharge line, a valve member in the casing movable into and out of closing relation to said inlet, and a buoyant valve body in the casing movable by gravity into closing relation with said outlet, said body being cooperable with said member under the influence of the inflow of fluid from said discharge line through said outlet to close said inlet and under the influence of the outflow of fluid from said outlet to hold said body out of closing relation to said outlet.

4. A combined shut-off and check valve assembly comprising a cylindrical valve casing having an inlet in communication with a liquid supply source and an outlet in communication with a discharge line, a sleeve-like valve member of smaller external diameter than the internal diameter of the casing in the casing, means in the casing spacing said member inwardly thereof to form a passageway between the casing and member, said member being movable into and out of closing relation with said inlet, a buoyant valve body in the casing movable by gravity into closing relation with said outlet, said body being engageable with said member under the influence of the flow of liquid from said discharge line through said outlet to move said member into closing relation with the inlet.

5. A combined shut-off and check valve assembly comprising a cylindrical valve casing having an inlet in communication with a liquid supply source and an outlet in communication with a discharge line, a sleeve-like valve member of smaller external diameter than the internal diameter of the casing in the casing, peripherally spaced internal lugs in the casing in engagement with the member and spacing the member from the casing to provide a passageway for liquid to flow between the casing and the member, said member being movable into and out of closing relation with the inlet, a buoyant valve body in the casing and movable by gravity into closing relation with said outlet, said body being cooperable with said member under the influence of the flow of liquid from said discharge line through said outlet to move said member into closing relation with the inlet.

6. A combined shut-off and check valve assembly comprising a cylindrical valve casing having an inlet in communication with a liquid supply source and an outlet in communication with a discharge line, a sleeve-like valve member in and spaced inwardly from the casing to form therewith a passageway for liquid to flow between the casing and the member, said member having a closed end and being movable into and out of closing relation with the inlet, a buoyant ball in the casing movable by gravity into closing relation with the outlet, said ball being movable under the influence of liquid in the casing into said member, said member having openings therethrough into said passageway for the escape of liquid from the member to the passageway and to cause a reduction in pressure in said member above said ball upon the flow of liquid from said inlet through said passageway.

7. A combined shut-off and check valve assembly comprising a cylindrical valve casing having an inlet in communication with a liquid supply source and an outlet in communication with a discharge line, a sleeve-like valve member of smaller external diameter than the internal diameter of the casing in the casing, peripherally spaced internal lugs in the casing in engagement with the member and spacing the member from the casing to provide a passageway for liquid between the casing and member, said member being movable into and out of closing relation with said inlet, means on the member engageable with said lugs to limit movement of said member in a direction to open said inlet, a buoyant ball in the casing movable by gravity into closing relation with the outlet, said ball being movable under the influence of gravity into said member, said member having openings therethrough into said passageway for the escape of liquid from the member to the passageway and to cause a reduction in pressure in said member above said ball upon the flow of liquid from said inlet through said passageway, said ball being cooperable with said member under the influence of the flow of liquid from said discharge line through said outlet to move said member into closing relation with said inlet.

8. A combined shut-off and check valve assembly comprising a valve casing having an inlet in communication with a liquid supply source and an outlet in communication with a discharge line, a valve member in the casing movable into and out of closing relation with the inlet, a buoyant valve body in the casing movable by gravity into closing relation with said outlet, said body being cooperable with said member under the influence of the inflow of liquid from the discharge line through said outlet to close the inlet, and under the influence of the outflow of liquid from said outlet to hold said body out of closing relation with said outlet, and manually operable means in the casing cooperable with said body to move the body out of closing relation with the outlet to initiate a flow of liquid from said source through said casing.

9. A combined shut-off and check valve assembly comprising a valve casing having an inlet in communication with a liquid supply source and an outlet in communication with a discharge line, a valve member in the casing movable into and out of closing relation with the inlet, a buoyant valve body in the casing movable by gravity into closing relation with said outlet and movable under the influence of liquid in the casing out of closing relation with said outlet, said body being cooperable with said member under the influence of the inflow of liquid from said discharge line through said outlet to close said inlet, and under the influence of the outflow of liquid from said outlet to hold said body out of closing relation with said outlet, and means in said outlet for controlling the flow of liquid through said casing.

10. A combined shut-off and check valve assembly comprising a U-tube having one leg thereof connected to the discharge outlet of a tank and the other leg thereof connected to a distribution line, a valve casing in said one leg and having an inlet in communication with said discharge outlet and an outlet in communication with said other leg, valve means in the casing operable by gravity to close the outlet when the liquid in the casing falls below a predetermined level, said valve means being operable under the influence of the inflow from said discharge line through said outlet to close said inlet and being movable under the influence of the outflow of liquid through said outlet to a position to open said outlet.

11. A combined shut-off and check valve assembly comprising a U-tube having one leg thereof connected to the discharge outlet of a tank and the other leg thereof connected to a distribution line, a valve casing in said one leg and having an inlet in communication with said discharge outlet and an outlet in communication with said other leg, a valve member in the casing movable into and out of closing relation to the inlet and buoyant means in the casing movable into and out of closing relation to the outlet, said buoyant means being operable under the influence of a continuous column of liquid in said U-tube to maintain said outlet open until the liquid in the casing falls below a predetermined level and also being cooperable with said member under the influence of the inflow of liquid from said other leg into said casing to close said inlet.

References Cited in the file of this patent

UNITED STATES PATENTS

| 1,264,296 | Hagan | Apr. 30, 1918 |
| 1,831,318 | O'Neil et al. | Nov. 10, 1931 |
| 2,513,862 | Hart | July 4, 1950 |

FOREIGN PATENTS

| 1,261 | Great Britain | Mar. 25, 1880 |
| 9,346 | Great Britain | Apr. 22, 1907 |
| 436,806 | Great Britain | Oct. 18, 1935 |